US011271712B2

(12) United States Patent
Joergensen et al.

(10) Patent No.: US 11,271,712 B2
(45) Date of Patent: Mar. 8, 2022

(54) DAISY-CHAINED SYNCHRONOUS ETHERNET CLOCK RECOVERY

(71) Applicant: Microchip Technology Inc., Chandler, AZ (US)

(72) Inventors: Thomas Joergensen, Soeborg (DK); Brian Branscomb, Hopkinton, MA (US)

(73) Assignee: Microchip Technology Inc., Chandler, AZ (US)

( * ) Notice: Subject to any disclaimer, the term of this patent is extended or adjusted under 35 U.S.C. 154(b) by 25 days.

(21) Appl. No.: 16/827,624

(22) Filed: Mar. 23, 2020

(65) Prior Publication Data

US 2021/0211267 A1   Jul. 8, 2021

Related U.S. Application Data

(60) Provisional application No. 62/958,225, filed on Jan. 7, 2020.

(51) Int. Cl.
*H04L 7/00* (2006.01)
*H04L 12/931* (2013.01)
*H04L 49/351* (2022.01)

(52) U.S. Cl.
CPC .......... *H04L 7/0079* (2013.01); *H04L 49/351* (2013.01)

(58) Field of Classification Search
CPC ... H04L 7/0079; H04L 49/351; G06F 13/385; G06F 1/14; G06F 13/00
See application file for complete search history.

(56) References Cited

U.S. PATENT DOCUMENTS

| 6,529,957 | B1 | 3/2003 | Joergensen |
| 8,571,014 | B2 | 10/2013 | Joergensen et al. |
| 8,619,755 | B2 | 12/2013 | Wang et al. |
| 8,666,331 | B2 * | 3/2014 | Carmon ................. G06F 1/12 |
| | | | 455/84 |
| 8,681,772 | B2 | 3/2014 | Ehlers et al. |
| 8,873,588 | B2 | 10/2014 | Joergensen |
| 9,166,831 | B2 * | 10/2015 | Bliss ................. H04L 25/03343 |
| 9,262,347 | B2 * | 2/2016 | Harriman ............ H04L 43/0858 |

(Continued)

FOREIGN PATENT DOCUMENTS

| CN | 101741539 A | 6/2010 |
| CN | 102045124 A | 5/2011 |

(Continued)

OTHER PUBLICATIONS

PCT/US2020/041194, International Search Report and Written Opinion, European Patent Office, dated Nov. 4, 2020.

(Continued)

*Primary Examiner* — Chandrahas B Patel
(74) *Attorney, Agent, or Firm* — Glass and Associates; Kenneth Glass; Kenneth D'Alessandro (57) ABSTRACT

A PHY chip for a synchronous Ethernet system includes N network input/output (I/O) ports, a first external recovered clock input, a first recovered clock output, and a first clock multiplexer having a plurality of data inputs, a select input, and an output coupled to the first recovered clock output, at least one of the data inputs coupled to a first recovered clock from a respective one of the N network I/O ports, a first additional data input coupled to the first external recovered clock input.

16 Claims, 6 Drawing Sheets

(56) References Cited

U.S. PATENT DOCUMENTS

| | | | |
|---|---|---|---|
| 9,735,950 B1 * | 8/2017 | Liu | H04L 7/0331 |
| 10,368,204 B2 * | 7/2019 | Nogueira-Nine | G01S 5/0027 |
| 10,832,757 B1 * | 11/2020 | Novellini | G11C 29/023 |
| 2015/0093109 A1 | 4/2015 | Joergensen | |
| 2019/0089615 A1 | 3/2019 | Branscomb et al. | |

FOREIGN PATENT DOCUMENTS

| | | |
|---|---|---|
| CN | 102195768 B | 6/2014 |
| CN | 102045124 B | 12/2014 |
| EP | 1940086 B1 | 1/2013 |
| EP | 2779490 A2 | 9/2014 |

OTHER PUBLICATIONS

Shu Xiao et al "Design and Implementation of Aggregation Platform for Extended Ethernet Transport and Services," 2014 IEEE Global Communications Conference, Nov. 1, 2009, pp. 1-7, sections III-A, III-B; figures 4, 7, 8.

* cited by examiner

| Clock Output Mux Source | Port Speed | Internal Rx Port Clock Frequency | Clock Output Divisor* | Clock Output Frequency |
|---|---|---|---|---|
| Internal Port | 10 Mbps | 2.5 MHz | /1 | 2.5 MHz |
|  | 100 Mbps | 25 MHz | /10 | 2.5 MHz |
|  | 1000 Mbps | 125 MHz | /50 | 2.5 MHz |
| Recovered Clock External Input | Any | N/A | /1 | Same as External Input |

*Clock output divisor for clock output dividers 212 and 242
may be set to be the same or different

DAISY-CHAINED SYNCHRONOUS ETHERNET CLOCK RECOVERY

REFERENCE TO RELATED APPLICATIONS

The present application claims priority to U.S. Provisional Patent Application Ser. No. 62/958,225, filed on Jan. 7, 2020, the contents of which are incorporated by reference herein in their entirety.

BACKGROUND

The present invention relates to synchronous Ethernet systems. More particularly, the present invention relates to synchronous Ethernet clock recovery.

A system supporting Synchronous Ethernet should be capable of using two clocks recovered from any two Ethernet ports as its primary and secondary timing references. This is commonly implemented by having each Ethernet physical layer device (PHY device, or PHY chip) provide two or more clock outputs, all of which are connected to the Synchronous Ethernet timing element (e.g. a digital phase locked loop (DPLL) device).

A large number of clocks must be connected to this timing element if the system has a large number of Ethernet ports. All the recovered clocks occupy printed circuit board (PCB) routing space and either require a DPLL with many clock inputs or there must be a separate input clock multiplexer circuit placed in front of the DPLL. This increases the PCB cost and the component cost.

Figure 1:
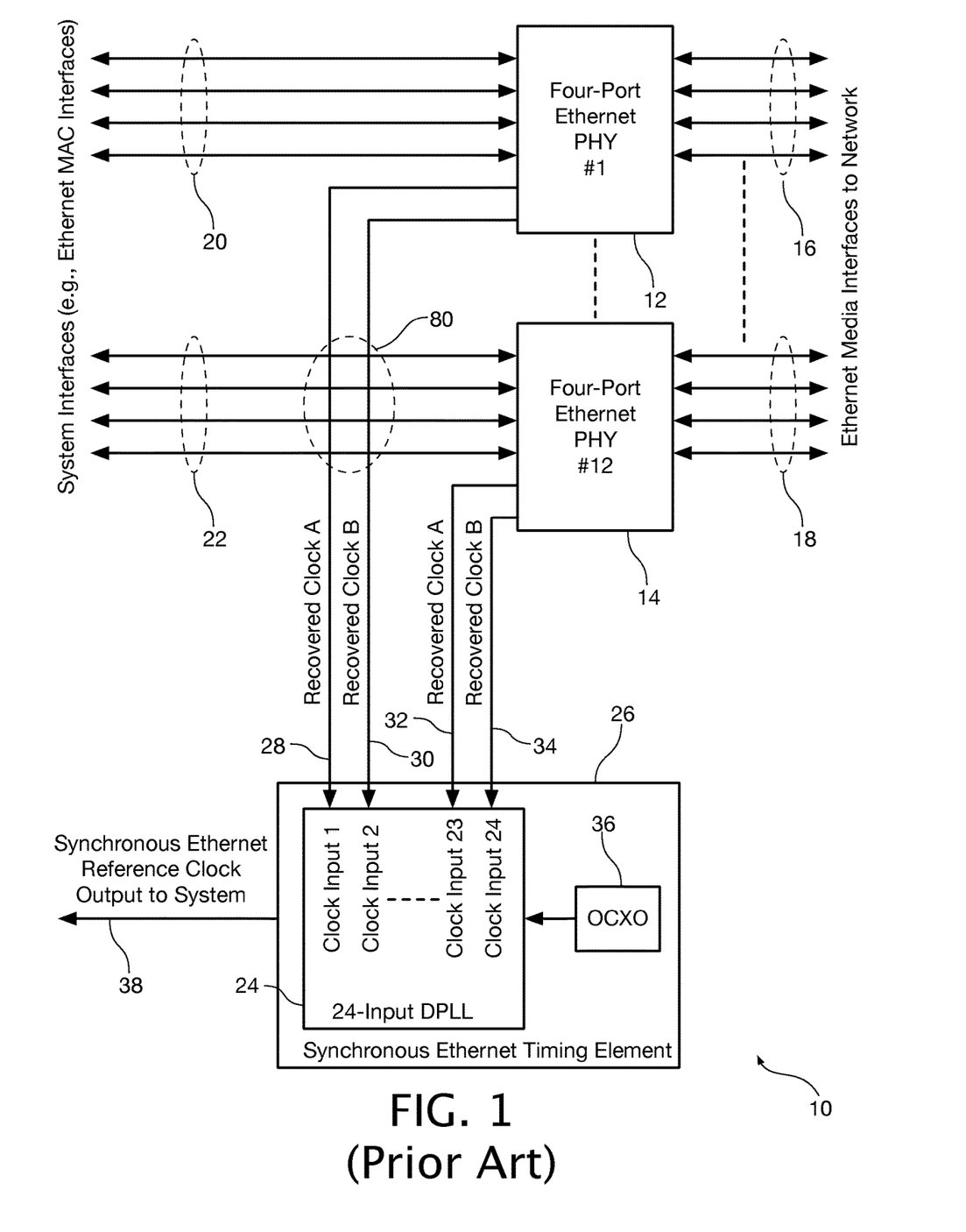
FIG. 1 is a diagram showing physical layout aspects of a prior-art example of a 48-port Ethernet system implemented using twelve four-port PHY chips.

FIG. 1 shows an exemplary 48-port Ethernet system 10 implemented using twelve four-port PHY chips (two of which are represented by reference numerals 12 and 14). The four network I/O ports of the PHY chip #1 12 are connected to interfaces to the network by printed circuit board traces that are indicated at reference numeral 16 and the four network I/O ports of the PHY chip #12 14 are connected to interfaces to the network by printed circuit board traces that are indicated at reference numeral 18. Four ports are connected to system interfaces such as Ethernet MAC interfaces to the system from the PHY chip #1 12 and the PHY chip #12 14 on printed circuit board traces that are shown collectively at reference numerals 20 and 22, respectively.

The two recovered clocks from each PHY chip are provided to a multi-input digital phase locked loop (DPLL) 24 inside of the synchronous Ethernet timing element 26. The synchronous Ethernet timing element 26 is separate from the PHY chips. As shown in FIG. 1, the recovered clock A from the PHY chip #1 12 is connected to the synchronous Ethernet timing element 26 by a printed circuit board trace shown at reference numeral 28 and the recovered clock B from the PHY chip #1 12 is connected to the synchronous Ethernet timing element 26 by a printed circuit board trace shown at reference numeral 30. Similarly, the recovered clock A from the PHY chip #12 14 is connected to the synchronous Ethernet timing element 26 by a printed circuit board trace shown at reference numeral 32 and the recovered clock B from the PHY chip #12 14 is connected to the synchronous Ethernet timing element 26 by a printed circuit board trace shown at reference numeral 34. The DPLL 24 is synchronized to a stable frequency source such as an oven-controlled crystal oscillator (OCXO) shown at reference numeral 36. The 48-port Ethernet system 10 implementation shown in FIG. 1 requires a 24-input DPLL to accommodate the recovered clocks A and B from each of the twelve PHY chips. The synchronous Ethernet timing element 26 provides a synchronous Ethernet reference clock output to the system as shown at reference numeral 38.

Figure 2:
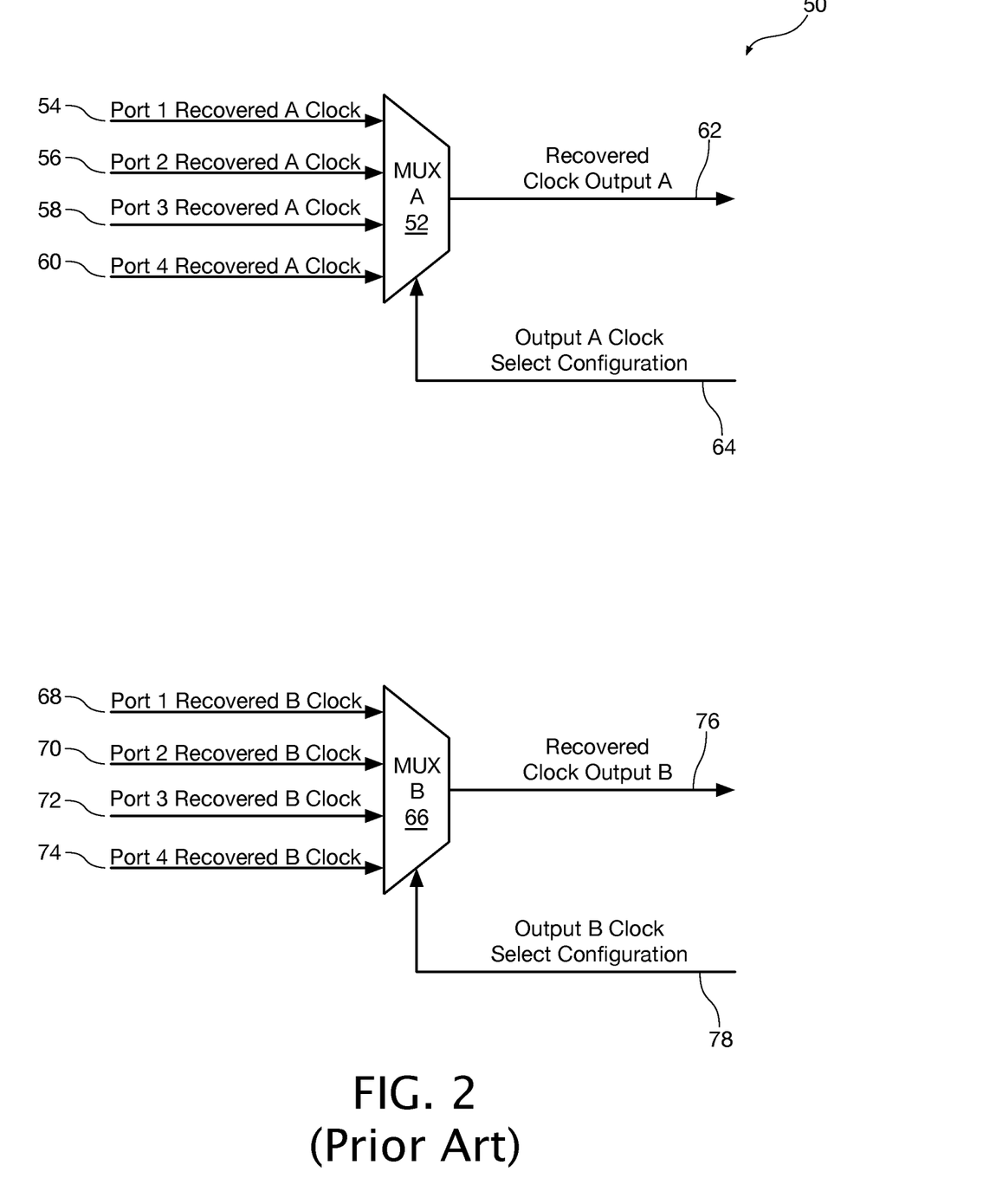
FIG. 2 is a block diagram of a typical clock multiplexer arrangement used in the PHY chips of FIG. 1.

Existing multiport Ethernet PHY chip solutions typically provide an internal clock multiplexer that selects between the recovered clocks of the internal PHYs and provide two or more recovered clock outputs. Referring now to FIG. 2, an illustrative PHY chip clock multiplexer arrangement 50 is shown.

A clock multiplexer A 52 has a data input 54 supplying the Port 1 recovered A clock, a data input 56 supplying the Port 2 recovered A clock, a data input 58 supplying the Port 3 recovered A clock, and a data input 60 supplying the Port 4 recovered A clock. The data output 62 of the clock multiplexer A 52 supplies the recovered clock output A as selected by the value presented on the select inputs 64 of the multiplexer A 52.

A clock multiplexer B 66 has a data input 68 supplying the Port 1 recovered B clock, a data input 70 supplying the Port 2 recovered B clock, a data input 72 supplying the Port 3 recovered B clock, and a data input 74 supplying the Port 4 recovered B clock. The data output 76 of the clock multiplexer B 66 supplies the recovered clock output B as selected by the value presented on the select inputs 78 of the clock multiplexer B 66.

As indicated previously, known existing solutions such as VSC8574 and VSC8584 available from Microchip Technology, Inc., of Chandler, Ariz., provide clock multiplexers supporting two recovered clock outputs (A and B). Other existing solutions such as Microchip's VSC8488 provide a single recovered clock output per port. These solutions have the drawbacks noted above. One such drawback is illustrated in FIG. 1 at reference numeral 80 where the PCB traces providing recovered clock A line 28 and the recovered clock B line 30 that are provided from the PHY chip #1 12 to the DPLL 24 in the synchronous Ethernet timing element 26 cross over the printed circuit board traces 22 connecting the four ports from the PHY chip #12 14 to the interfaces to the system. While not shown in FIG. 1, similar PCB trace crossovers exist for the recovered clock A line and the recovered clock B line that are provided from the PHY chips #2 through #11 (not shown) to the DPLL 24 in the synchronous Ethernet timing element 26.

BRIEF DESCRIPTION

According to an aspect of the invention, a physical layer (PHY) chip for a synchronous Ethernet system includes N network input/output (I/O) ports where N is an integer, a first external recovered clock input, a first recovered clock output, and a first clock multiplexer having a plurality of data inputs, a select input, and an output coupled to the first recovered clock output, at least one of the data inputs coupled to a first recovered clock from a respective one of the N network I/O ports, a first additional data input coupled to the first external recovered clock input.

According to an aspect of the invention, a recovered clock from each of the N network I/O ports are coupled to respective ones of the plurality of data inputs.

According to an aspect of the invention, the PHY chip further includes a first source of configuration bits coupled to the select input of the first clock multiplexer.

According to an aspect of the invention, the first source of configuration bits is a first configuration bits register.

According to an aspect of the invention, N=4.

According to an aspect of the invention, the PHY chip further includes a first clock output divider having an input coupled to the output of the first clock multiplexer, an output coupled to the first recovered clock output, the first clock output divider controlled by configuration bits supplied by a configuration bits register.

According to an aspect of the invention, the PHY chip further includes M system interfaces where M is an integer, wherein the N network input/output (I/O) ports are connected to a first set of I/O pins on the PHY chip, the M system interfaces are connected to a second set of I/O pins on the PHY chip, the first external recovered clock input is connected to a third set of I/O pins on the PHY chip, the first recovered clock output is connected to a fourth set of I/O pins on the PHY chip, and the sets of I/O pins are arranged radially around a periphery of the PHY chip in the order of one of the first and second sets of I/O pins, one of the third and fourth sets of I/O pins, the other of the first and second sets of I/O pins, and the other of the third and fourth sets of I/O pins.

According to an aspect of the invention, the third and fourth sets of I/O pins and at least one of the first and second sets of I/O pins are physically located on a same side of a package containing the PHY chip.

According to an aspect of the invention, the PHY chip further includes a second external recovered clock input, a second recovered clock output, and a second clock multiplexer having a plurality of data inputs, a respective select input, and an output coupled to the second recovered clock output, at least one of the data inputs coupled to a second recovered clock from a respective one of the N network I/O ports, a first additional data input coupled to the first external recovered clock input and a second additional data input coupled to the second external recovered clock input.

According to an aspect of the invention, the second external recovered clock input is coupled to a second additional data input of the first clock multiplexer.

According to an aspect of the invention, the PHY chip further includes a second source of configuration bits coupled to the respective select input of the second clock multiplexer.

According to an aspect of the invention, the second source of configuration bits is a second configuration bits register.

According to an aspect of the invention, a method for providing a recovered clock in a PHY chip for a synchronous Ethernet system having a plurality of network interface ports includes receiving an external recovered clock signal from at least one of the plurality of network interface ports of the PHY chip, receiving a recovered clock signal from a source outside the PHY chip, and selecting an output clock signal from among the recovered clock signal from the source outside the PHY chip and the external recovered clock signal from the at least one of the plurality of network interface ports of the PHY chip.

According to an aspect of the invention, the method further includes dividing the output clock signal by a divisor.

According to an aspect of the invention, receiving a recovered clock signal from a source outside the PHY chip includes receiving first and second recovered clock signals from sources outside the PHY chip, and selecting an output clock signal from among the recovered clock signal from the source outside the PHY chip and the external recovered clock signal from the at least one of the plurality of network interface ports of the PHY chip comprises selecting a first output clock signal from among the first and second recovered clock signals from the source outside the PHY chip and the external recovered clock signals from the at least one of the plurality of network interface ports of the PHY chip, and selecting a second output clock signal from among the first and second recovered clock signals from the source outside the PHY chip and the external recovered clock signals from the at least one of the plurality of network interface ports of the PHY chip.

According to an aspect of the invention, the method further includes dividing the first output clock signal by a first divisor, and dividing the second output clock signal by a second divisor.

According to an aspect of the invention, the first divisor and the second divisor are equal.

According to an aspect of the invention, the first divisor and the second divisor are not equal.

BRIEF DESCRIPTION OF THE DRAWING FIGURES

The invention will be explained in more detail in the following with reference to embodiments and to the drawing in which are shown.

DETAILED DESCRIPTION

Persons of ordinary skill in the art will realize that the following description is illustrative only and not in any way limiting. Other embodiments will readily suggest themselves to such skilled persons.

Figure 3:
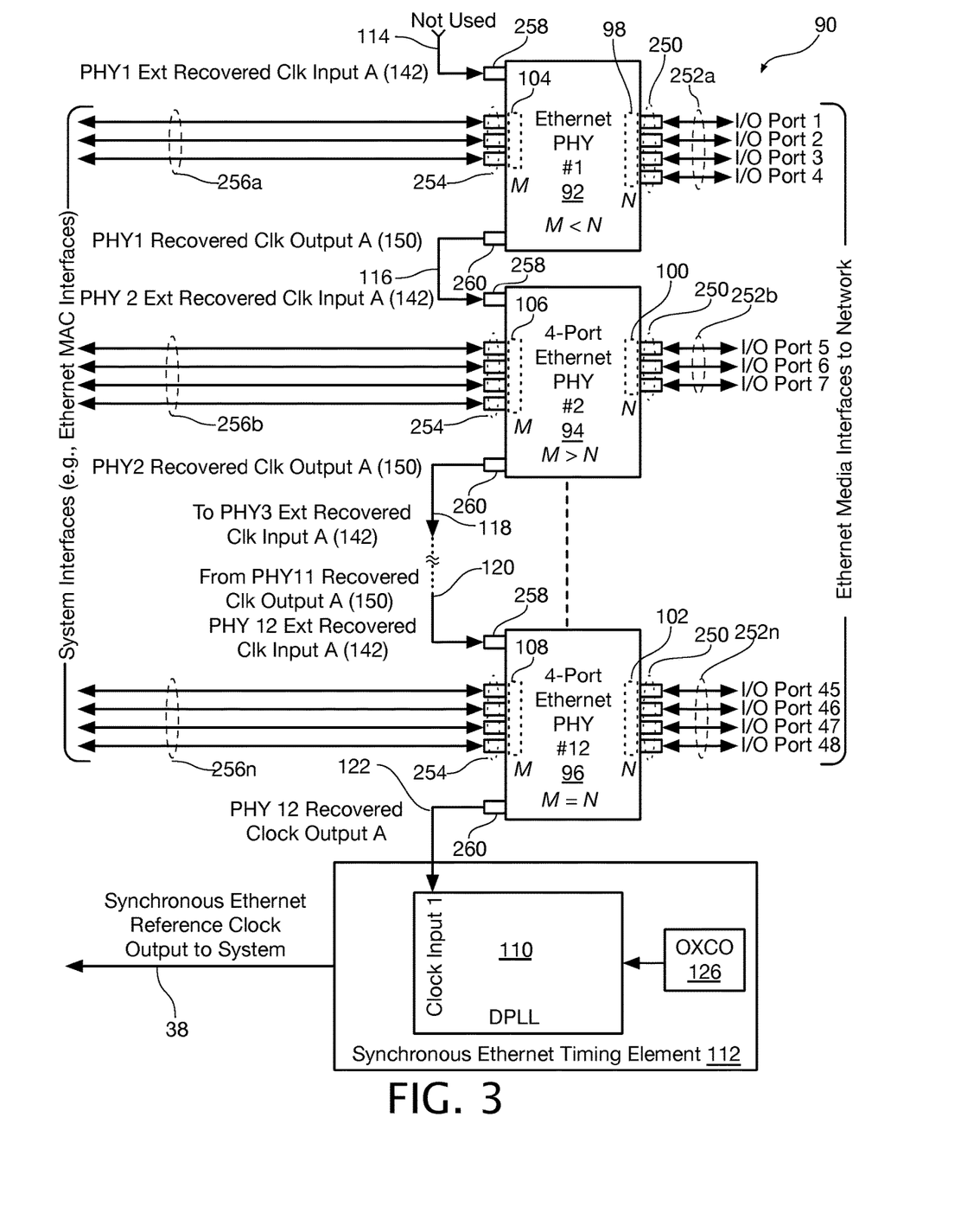
FIG. 3 is a diagram showing physical layout aspects of an illustrative 48-port Ethernet system implemented using twelve four-port PHY chips in accordance with an aspect of the present invention.

Referring now to FIG. 3, a diagram shows an illustrative multi-port Ethernet system 90 in accordance with an aspect of the present invention implemented using twelve PHY chips (three of which are represented by reference numerals 92, 94, and 96). Though exemplary Ethernet system 90 is shown to include twelve PHY chips, in other embodiments more or fewer PHY chips could be used. Persons of ordinary skill in the art will appreciate that PHY chips in accordance with the present invention can be generalized as including N network I/O ports. The N network I/O ports of the PHY chip #1 92 that are connected to Ethernet media interfaces to the network are indicated symbolically as rectangles in dashed lines at reference numeral 98, the N network I/O ports of the PHY chip #2 94 that are connected to interfaces to the network are indicated symbolically as rectangles in dashed lines at reference numeral 100, and the N network I/O ports of the PHY chip #12 96 that are connected to interfaces to the network are indicated symbolically as rectangles in dashed lines at reference numeral 102.

In the system 90, M ports to system interfaces such as Ethernet MAC interfaces are shown from each of PHY chip

1 92, the PHY chip #2 94, and the PHY chip #12 96. These ports are shown symbolically as rectangles in dashed lines in each PHY chip at reference numerals 104, 106, and 108, respectively. Furthermore, for purposes of illustration only, in PHY chip #1 92, N=4 and M=3, in PHY chip #2 94, N=3 and M=4, in PHY chip #12 96, N=4 and M=4, for the sole purpose of showing that M may be less than, equal to or greater than N Persons of ordinary skill in the art will understand that the values of N and M will typically be the same for each PHY chip in any given system.

In accordance with an aspect of the present invention, the recovered clock output A signals from the PHY chips in the system shown in FIG. 3 are connected in a daisy chain fashion instead of each being provided to the multi-input DPLL 110 inside of a synchronous Ethernet timing element 112. As shown in FIG. 3, the PHY chip #1 92 has a recovered clock input carried by a printed circuit board trace 114 which is not used since the PHY chip #1 92 is the first PHY chip in the daisy chained system. The recovered clock output A from the PHY chip #1 92 is carried to the external recovered clock input A of the PHY chip #2 by a printed circuit board trace shown at reference numeral 116 instead of to the DPLL 110 in the synchronous Ethernet timing element 112 as in the prior-art system depicted in FIG. 1.

Similarly, the recovered clock output A from the PHY chip #2 94 is carried by a printed circuit board trace shown at reference numeral 118 and is provided to the external recovered clock input A of the next PHY chip #3 (not shown). The recovered clock output A from the PHY chip #11 (not shown) is provided to the external recovered clock input A of PHY chip #12 96 by printed circuit board trace 120 as shown. The recovered clock output A from the PHY chip #12 96, is provided to the DPLL 110 of the synchronous Ethernet timing element 112 by a printed circuit board trace shown at reference numeral 122. The DPLL 110 is synchronized to a stable frequency source such as an oven-controlled crystal oscillator (OCXO) shown at reference numeral 124. DPLL 110 is advantageously a 1-input DPLL thus providing reduced cost over the prior-art arrangement shown in FIG. 1, which required one input per PHY chip in the system.

The illustrative embodiment shown in FIG. 3 is being described in relation to recovery of a single clock, i.e. each PHY chip outputs a first recovered clock (clock output A). However, this is not meant to be limiting in any way, and in certain embodiments as will be shown herein, more than one recovered clock output can be provided from at least one of the PHY chips.

The multiport Ethernet PHY chip solution of the present invention provides at least one clock multiplexer internal to each PHY chip (e.g. PHY chips 92, 94, 96) that selects between the recovered clocks of the PHY which contains it and at least one external recovered clock input. The internal clock multiplexer also provides one or more recovered clock outputs. One of the advantages of the present invention is that in some embodiments of the invention a clock recovered from any of the network I/O ports 1-48 (from among 98, 100, 102 in FIG. 3) may be provided as the recovered clock output A from the PHY chip #12 96, on the printed circuit board trace shown at reference numeral 124 and fed to the synchronous Ethernet timing element 112.

Figure 4:
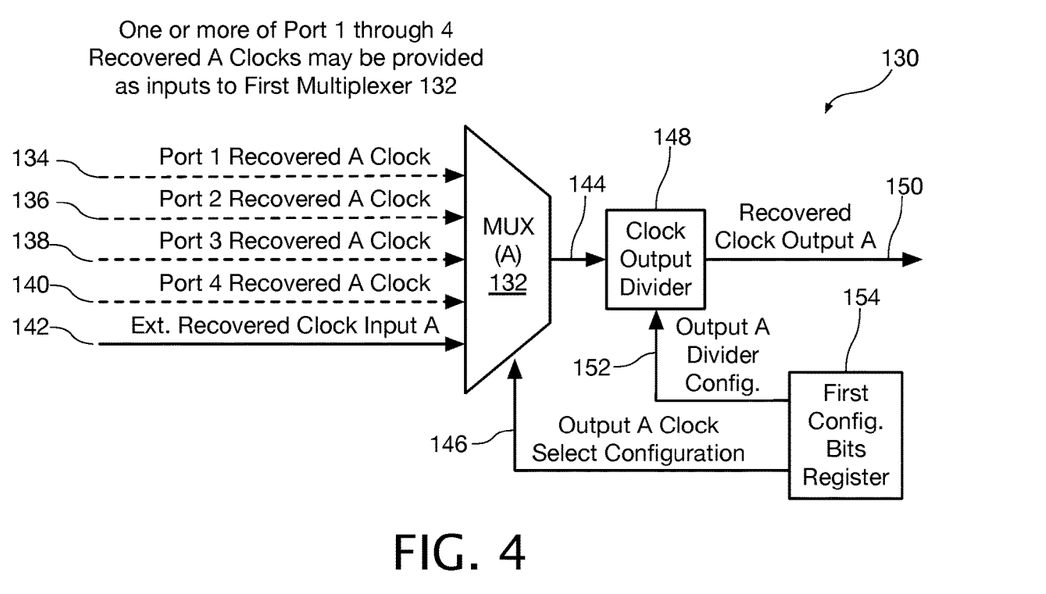
FIG. 4 is a block diagram of an illustrative clock multiplexer arrangement used in the PHY chips of FIG. 3 in accordance with an aspect of the present invention.

Referring now to FIG. 4, an illustrative PHY chip clock multiplexer arrangement 130 is shown in accordance with an aspect of the present invention. A clock multiplexer (A) 132 has a data input 134 supplying the network I/O Port 1 recovered A clock, a data input 136 supplying the network I/O Port 2 recovered A clock, a data input 138 supplying the network I/O Port 3 recovered A clock, and a data input 140 supplying the network I/O Port 4 recovered A clock. Persons of ordinary skill in the art will appreciate that in embodiments of the invention it is not necessary that recovered clocks from all of the network I/O ports be connected to clock multiplexer data inputs. In a PHY chip having N network I/O ports, the clock multiplexer 132 may have data inputs connected to recovered clocks of fewer than all N of the network I/O ports (e.g., from 1 to N of the network I/O ports be connected to clock multiplexer data inputs) as shown by the data inputs 134, 136, 138, and 140 of the clock multiplexer 132 being represented as dashed lines. At a minimum, at least one of the N network I/O ports are connected to a respective clock multiplexer data input.

In addition to the up to four data inputs sourced by the recovered A clocks from the Ports 1-4, the clock multiplexer 132 has an additional data input. The additional data input 142 is a first external recovered clock input and provides the external recovered clock input A from the previous PHY chip in the daisy chain. The additional data input 142 is sourced by the recovered clock output A from the previous PHY chip in the daisy chain. This input is not used by the first PHY chip in the daisy chain as shown by the printed circuit board trace 114 of the PHY chip #1 12 in FIG. 3. The data output 144 of the clock multiplexer (A) 132 supplies the recovered clock output A as selected by the value presented on the select inputs 146 of the clock multiplexer A 132, denoted as output A clock select configuration.

In accordance with another aspect of the present invention, the data output 144 of the clock multiplexer 132 may optionally drive a clock output divider 148. The output of the clock output divider 148 is presented on line 150 as the recovered clock output A. The divisor of the clock output divider 148 is configurable and is controlled by output A divider configuration bits presented to the clock output divider 148 on divider configuration input lines 152. The output A clock select configuration bits for the clock multiplexer (A) 132 on lines 146 and the output A divider configuration bits on divider configuration input lines 152 are supplied by a source of configuration bits such as a configuration-bits register 154 as is known in the art. While a single configuration-bits register 154 is illustrated, there is no requirement that the optional output A divider configuration bits and the output A clock select configuration bits be part of a single register, and multiple configuration-bits registers may be utilized without exceeding the scope of the invention.

Figure 5:
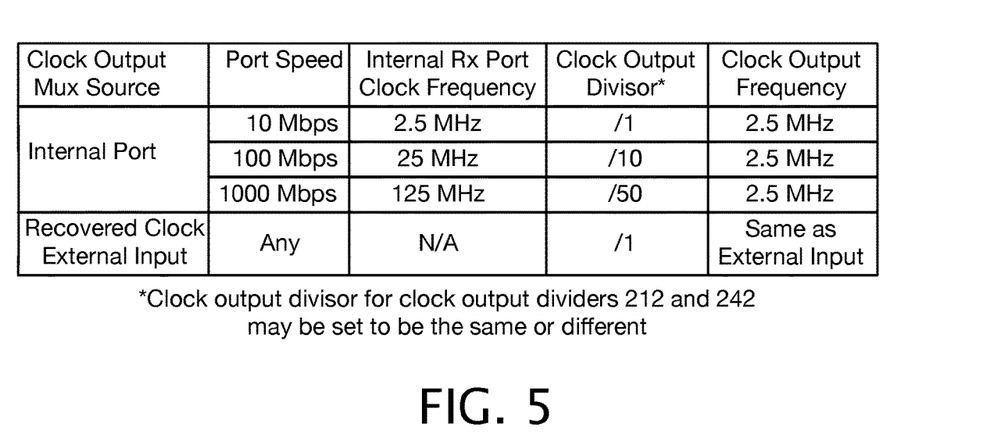
FIG. 5 is a table showing use of the clock multiplexer and clock output divider of FIG. 4 at example port speeds.

Referring now to FIG. 5, a table shows of the use of the clock multiplexer A 132 and clock output divider 148 at example port speeds of 10 Mbps, 100 Mbps, and 1000 Mbps providing an output clock frequency of 2.5 MHz. The clock output divider 148 provides a choice of divisors that may be set to allow the recovered clocks to be at the same frequency regardless of Ethernet port speed.

Figure 6:
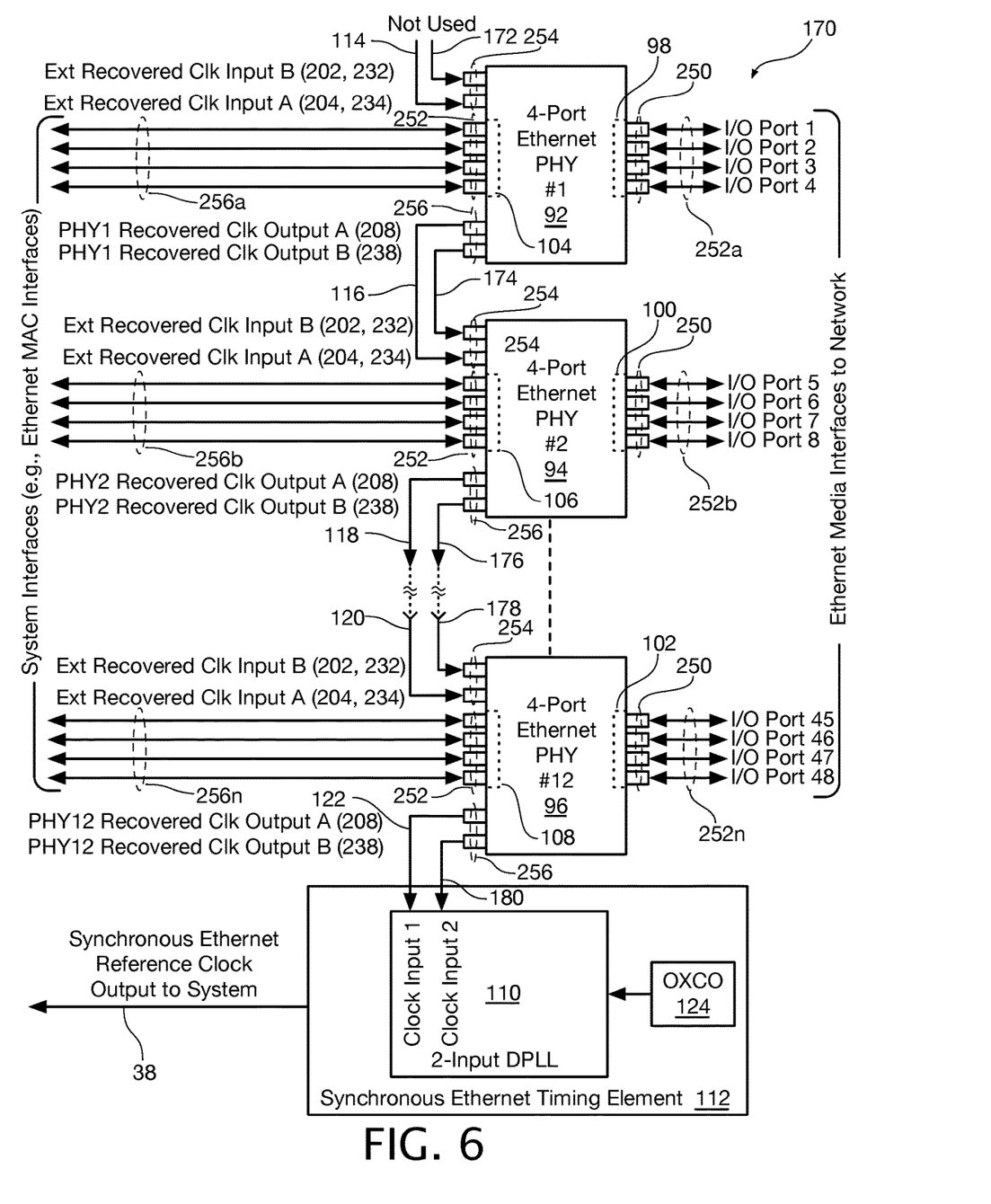
FIG. 6 is a diagram showing physical layout aspects of another illustrative 48-port Ethernet system implemented using twelve four-port PHY chips in accordance with an aspect of the present invention.

Referring now to FIG. 6, a diagram shows another illustrative 48-port Ethernet system 170 in accordance with an aspect of the present invention implemented using twelve four-port PHY chips (three of which are represented by reference numerals 92, 94, and 96). The Ethernet system 170 of FIG. 6 shares certain ones of its elements with the Ethernet system 90 of FIG. 3. Elements in the Ethernet system 170 of FIG. 6 that are common to the Ethernet system 90 of FIG. 3 will be referred to in FIG. 6 using the same reference numerals that identified those elements in FIG. 3.

The four network I/O ports of the PHY chip #1 92 that provide Ethernet media interfaces to the network are indicated symbolically as rectangles in dashed lines at reference numeral 98, the four network I/O ports of the PHY chip #2 94 that provide interfaces to the network are indicated symbolically as rectangles in dashed lines at reference numeral 100, and the four network I/O ports of the PHY chip #12 96 that provide interfaces to the network are indicated symbolically as rectangles in dashed lines at reference numeral 102.

Four ports to the system interfaces from the PHY chip #1 92, the PHY chip #2 94, and the PHY chip #12 96 are shown symbolically as rectangles in dashed lines at reference numerals 104, 106, and 108, respectively. While twelve PHY chips are included in the 48-port Ethernet system 170 of FIG. 6, those skilled in the art will recognize that any number of PHY chips may be utilized. Furthermore, which each PHY chip (92, 94, 96) are illustrated as having 4 system interfaces, M system interfaces may be provided for each PHY chip, with M being an integer and M may be less than, equal to or greater than N. As previously noted, in some embodiments of the invention, the system interfaces to which ports 104, 106, and 108 are connected may be Ethernet MAC interfaces. In the illustrative example of FIG. 6, the connections to the network I/O ports are numbered consecutively, from I/O port 1 being the first network I/O port of PHY chip #1 92 to I/O port 48 being the fourth network I/O port of PHY chip #12 96.

Each of the PHY chips 92, 94, and 96 in the Ethernet system 170 of FIG. 6 is provided with two recovered clock inputs including the recovered clock input A and an additional recovered clock input B. Each of the PHY chips 92, 94, and 96 in the Ethernet system 170 of FIG. 6 provides two recovered clock outputs including the recovered clock output A and an additional recovered clock output B.

The recovered clock A and B inputs and outputs to/from the PHY chips in the Ethernet system 170 shown in FIG. 6 are connected in a daisy chain fashion like the recovered clock A inputs and outputs in the Ethernet system 90 of FIG. 3. As shown in FIG. 6, the recovered clock output A of PHY chip #1 92 is connected to the recovered clock input A of PHY chip #2 94 by printed circuit board trace 116. The recovered clock output B of PHY chip #1 92 is connected to the recovered clock input B of PHY chip #2 94 by printed circuit board trace 174. Similarly, the recovered clock output A from the PHY chip #2 94 and the recovered clock output B from the PHY chip #2 94 are provided to the recovered clock input A and the recovered clock input B of the next PHY chip (not shown) by printed circuit board traces 118 and 176, respectively. The recovered clock outputs A and B from the PHY chip #11 (not shown) are provided to the external recovered clock input A and external recovered clock input B of PHY chip #12 96 by printed circuit board traces 120 and 178, respectively. The recovered clock output A from the PHY chip #12 96, and the recovered clock output B from the PHY chip #12 96, are both provided to the DPLL 110 of synchronous Ethernet timing element 112 by printed circuit board traces 122 and 180, respectively. The DPLL 110 is synchronized to a stable frequency source such as an oven-controlled crystal oscillator (OCXO) shown at reference numeral 124. The DPLL 110 in the system of FIG. 6 is advantageously a 2-input DPLL thus providing reduced cost over the prior art.

The illustrative embodiment shown in FIG. 6 is being described in relation to recovery of 2 clocks, i.e. each PHY chip outputs a first clock (clock output A) and a second clock (clock output B). However this is not meant to be limiting in any way, and in certain embodiments, such as the one described above with reference to FIG. 3, only a single clock output is provided from at least one of the PHY chips or more than one clock output can be provided from at least one of the PHY chips.

The multiport Ethernet PHY chip solution of the present invention provides clock multiplexers internal to each PHY chip (e.g. PHY chips 92, 94, 96) that selects between the recovered clocks of the internal PHYs and the external recovered clock inputs and provides one or more recovered clock outputs. One of the advantages of the present invention is that a clock recovered from any of the network I/O ports 1-48 (from among 98, 100, 102 in FIG. 6) may be provided as the recovered clock output A from the PHY chip #12 96, and as the recovered clock output B from the PHY chip #12 96, and fed to the DPLL 110 in the synchronous Ethernet timing element 112.

Figure 7:
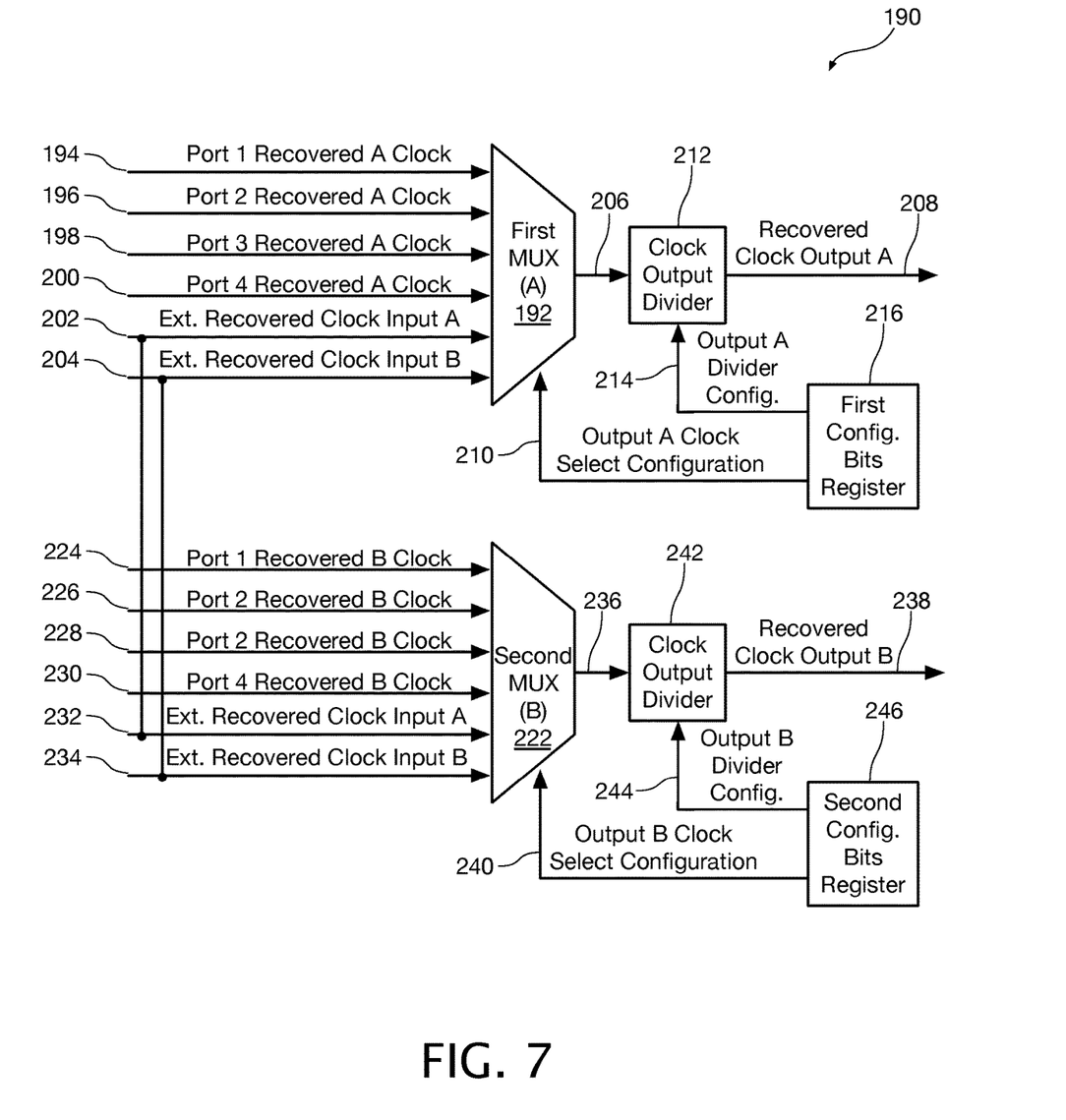
FIG. 7 is a block diagram of a clock multiplexer arrangement that may be used in the PHY chips of FIG. 6 in accordance with an aspect of the present invention.

Referring now to FIG. 7, an illustrative PHY chip clock multiplexer arrangement 190 is shown in accordance with an aspect of the present invention. A first clock multiplexer (A) 192 has a data input 194 supplying the network I/O Port 1 recovered A clock, a data input 196 supplying the network I/O Port 2 recovered A clock, a data input 198 supplying the network I/O Port 3 recovered A clock, and a data input 200 supplying the network I/O Port 4 recovered A clock. Persons of ordinary skill in the art will appreciate that in embodiments of the invention it is not necessary that recovered clocks from all of the network I/O ports be connected to clock multiplexer data inputs. In a PHY chip having N network I/O ports, the first clock multiplexer 192 may have data inputs connected to recovered clocks of fewer than all N of the network I/O ports (e.g., from 1 to N of the network I/O ports be connected to clock multiplexer data inputs). At a minimum, at least one of the N network I/O ports are connected to a respective clock multiplexer data input of the first clock multiplexer (A) 192.

In addition to the four data inputs sourced by the recovered A clocks from the Ports 1-4, the first clock multiplexer (A) 192 has two additional data inputs. The first additional data input 202 is a first external recovered clock input and provides the external recovered clock input A from the previous PHY chip in the daisy chain. The second additional data input 204 is a second external recovered clock input and provides the external recovered clock input B from the previous PHY chip in the daisy chain. The data input 202 and the data input 204 are sourced by the recovered clock outputs A and B from the previous PHY chip in the daisy chain. These data inputs are not used by the first PHY chip in the daisy chain as shown by inputs 114 and 172 of the PHY chip #1 12 in FIG. 6. The data output 206 of the first clock multiplexer (A) 192 is the source of the recovered clock output A 208 as selected by the value presented on the select inputs 210 of the first clock multiplexer (A) 192, denoted as output A clock select configuration.

In accordance with another aspect of the present invention, the data output 206 of the first clock multiplexer (A) 192 may optionally drive a first clock output divider 212. The output of the first clock divider 212 is presented on line 208 as the recovered clock output A. The divisor of the first clock output divider 212 is configurable and is controlled by output A divider configuration bits presented to the first clock output divider 212 on divider configuration input lines 214. The output A clock select configuration bits for the first clock multiplexer (A) 192 on the select inputs 210 and the output A divider configuration bits on divider configuration input lines 214 for the first clock output divider 212 are supplied by a source of configuration bits such as a first configuration-bits register 216 as is known in the art. While a single first configuration-bits register 216 is illustrated, there is no requirement that the optional output A divider configuration bits and the output A clock select configuration bits be provided by a single first configuration bits register 216, and multiple configuration-bits registers may be utilized without exceeding the scope of the present invention.

A second clock multiplexer (B) 222 is configured similarly to the first clock multiplexer (A) 192 and has a data input 224 supplying the network I/O Port 1 recovered B clock, a data input 226 supplying the network I/O Port 2 recovered B clock, a data input 228 supplying the network I/O Port 3 recovered B clock, and a data input 230 supplying the network I/O Port 4 recovered B clock. Persons of ordinary skill in the art will appreciate that in embodiments of the invention it is not necessary that recovered clocks from all of the network I/O ports be connected to clock multiplexer data inputs. In a PHY chip having N network I/O ports, the second clock multiplexer 222 may have data inputs connected to recovered clocks of fewer than all N of the network I/O ports (e.g., from 1 to N of the network I/O ports be connected to clock multiplexer data inputs). At a minimum, at least one of the N network I/O ports are connected to a respective clock multiplexer data input of the second clock multiplexer (B) 222. Providing both the external recovered clock input A and the external recovered clock input A to the first and second clock multiplexers 192 and 222 allows maximum flexibility for selecting a recovered output clock.

In addition to the four data inputs sourced by the recovered B clocks from the Ports 1-4, the second clock multiplexer (B) 222 has two additional data inputs. The first additional data input 232 is a first external recovered clock input and provides the external recovered clock input A from the previous PHY chip in the daisy chain. The second additional data input 234 is a second external recovered clock input and provides the external recovered clock input B from the previous PHY chip in the daisy chain. The first additional data input 232 and the second additional data input 234 are sourced by the recovered clock outputs A and B from the previous PHY chip in the daisy chain. These additional inputs are not used by the first PHY chip in the daisy chain as shown by inputs 114 and 172 of the PHY chip #1 92 in FIG. 6. The first additional data inputs 202 and 232 are tied together and the second additional data inputs 204 and 234 are tied together since they are driven from the same signals. The data output 236 of the second clock multiplexer (B) 222 supplies the recovered clock output B 238 as selected by the value presented on the select inputs 240 of the clock multiplexer B 222, denoted as output B clock select configuration bits.

As with the first clock multiplexer (A) 192, the data output 236 of the second clock multiplexer 222 may optionally drive a second clock output divider 242. The output of the second clock divider 242 is presented on line 238 as the recovered clock output B. The divisor of the second clock output divider 242 is configurable and is controlled by output B divider configuration bits presented to the second clock output divider 242 on divider configuration input lines 244. The output B clock select configuration bits for the second clock multiplexer 222 on select input 240 and the output B divider configuration bits for the clock output divider 242 are supplied by a source of configuration bits such as a second configuration-bits register 246 as is known in the art. Persons of ordinary skill in the art will appreciate that the output B clock select configuration bits and the optional output B divider configuration bits can be provided by multiple configuration-bits registers may be utilized without exceeding the scope of the invention.

Referring again to FIG. 5, a table shows of the use of the clock multiplexer A 192 and clock multiplexer B 222 and clock output dividers 212 and 242 at example port speeds of 10 Mbps, 100 Mbps, and 1000 Mbps providing an output clock frequency of 2.5 MHz. The configurable clock output dividers 212, 242 each independently provide a choice of divisors that may be set to divide by the same divisor or by different divisors to allow the recovered clocks to be at the same frequency regardless of Ethernet port speed.

As can be seen from an examination of FIG. 6 and FIG. 7, it is possible to daisy-chain the recovered clocks by expanding the internal recovered clock multiplexer to take in two more clock inputs from the previous PHY chip in the chain.

Referring again to FIG. 3 and FIG. 6, another aspect of the present invention is illustrated. In both the illustrative 48-port Ethernet systems 90 of FIG. 3 and 170 of FIG. 6, each of the 4-Port Ethernet PHY chips 92, 94 and 96 have a plurality of I/O pins. Some chips have I/O pads depending on the physical configuration of the chip but the word "pins" will be used herein to designate both types of I/O structures. Certain ones of these I/O pins are represented by small squares in FIG. 3 and in FIG. 6 disposed around the periphery of the PHY chip. For purposes of the I/O pins, the rectangles defining the PHY chips in FIG. 3 and FIG. 6 are intended to represent top views showing physical boundaries of the peripheries of all four sides of the PHY chips and the relative locations of the I/O pins.

A first set of I/O pins 250 of each of the PHY chips 92, 94 and 96 are associated with the network I/O ports (reference numerals 98, 100, and 102 in FIG. 3 and FIG. 6), and connect to the Ethernet media interfaces by printed circuit board traces collectively identified by reference numeral 252a, 252b, and 252n, respectively. A second set of I/O pins 254 are associated with the system interfaces (reference numerals 104, 106, and 108 in FIG. 3 and FIG. 6), and connect to the System Interfaces by printed circuit board traces collectively identified by reference numeral 256a, 256b, and 256n, respectively. A third set of I/O pins 258 are associated with the first external recovered clock input (external recovered clock input A) of FIG. 3, and the first and second external recovered clock inputs (external recovered clock input A and external recovered clock input B), respectively, of FIG. 6, and a fourth set of I/O pins 260 are associated with the first external recovered clock output (external recovered clock output A) of FIG. 3, and the first and second recovered clock outputs (external recovered clock input A and external recovered clock input B), respectively, of FIG. 6.

In most designs the printed circuit board traces (252a, 252b, 252n, 256a, 256b, and 256n) from the first and second sets of I/O pins 250 and 254 tend to run east-west while the printed circuit board traces (114, 116, 118, 120, 122, 172, 174, 176, 178, and 180) from the third and fourth sets of I/O pins 258 and 260 tend to run north-south. In accordance with an aspect of the invention, the locations of the sets of I/O pins on the PHY chips are chosen to facilitate this arrangement without having to provide for printed circuit board traces connected to these sets of I/O pins to cross each other. Viewed another way, as positioned at the periphery of the PHY chips, the sets of I/O pins are arranged radially in the order of one of sets 250 and 252, one of sets 254 and 256, the other of 250 and 252 and the other of 254 and 256. In the particular embodiment shown in FIG. 6, the second, third and fourth sets of I/O pins 252, 254, and 256 are located at the same (west) sides of each PHY chip and the first set of I/O pins 250 is located on the east sides of each PHY chip and it can be seen that (radially moving counterclockwise) the sets of I/O pins are arranged in the order of set 250, then set 254, then set 252, then set 206. In other embodiments, the first, third and fourth sets of I/O pins 250, 254, and 256 are located at the same (west) sides of the PHY chips and the second set of I/O pins 252 is located on the east sides of each PHY chip. In other embodiments, the first and second sets of I/O pins 250 and 252 may be located on the same sides (east or west) or on opposite sides (east and west) of the PHY chips as shown in FIG. 6 and the third set of I/O pins 254 may be located on the south sides of the PHY chips and the fourth set of the I/O pins 256 may be located on the north sides of the PHY chips. In all of these configurations, the third set of I/O pins 254 may be connected to the fourth set of I/O pins 256 of successive PHY chips (e.g., PHY chip #1 (92) to PHY chip #2 (94) without the printed circuit board traces having to cross any of the printed circuit board traces used to access the first and second sets of I/O pins 250, 252 on any of the PHY chips. This simplifies and lowers the cost of printed circuit board design.

The clock output dividers (148 in FIGS. 4, 212 and 242 in FIG. 7) allow the recovered clocks to be at the same frequency regardless of the Ethernet port speed, further simplifying the requirements for the DPLL 110. By physically locating the recovered clock inputs and outputs on a single side of the PHY chip it is relatively easy to route the signals on the PCB without adding layers or plate throughs to accomplish cross over wiring.

The present invention as shown in the illustrative embodiment of FIG. 6 integrates two clock multiplexers inside the physical layer devices as shown in FIG. 7, each of which can select between internal recovered clocks as well as external recovered clocks and provide the outputs of the clock multiplexers to the next physical layer device or DPLL. For a 48-port Ethernet system the present invention requires only a two-input DPLL instead of a 48-input DPLL, further reducing system cost. This multiplexing structure allows the clock recovered from any two ports in the system 170 to be connected to the DPLL 110.

Persons of ordinary skill in the art will appreciate that clock cleanup (e.g. jitter attenuation) is performed in the DPLL 110, so some jitter accumulation is acceptable in the daisy-chaining. Such skilled persons will appreciate that there will still be practical limits on the number of PHY chips in the daisy-chain due to jitter accumulation, which will vary from system to system.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A physical layer (PHY) chip for a synchronous Ethernet system comprising:
N network input/output (I/O) ports where N is an integer;
a first external recovered clock input;
a first recovered clock output; and
a first clock multiplexer having a plurality of data inputs, a select input, an output coupled to the first recovered clock output and a first additional data input coupled to the first external recovered clock input, a recovered clock from each of the N network I/O ports coupled to respective ones of the plurality of data inputs.

2. The PHY chip of claim 1 where N=4.

3. The PHY chip of claim 1 further comprising:
a first source of configuration bits coupled to the select input of the first clock multiplexer.

4. The PHY chip of claim 3 wherein:
the first source of configuration bits is a first configuration bits register.

5. A physical layer (PHY) chip for a synchronous Ethernet system comprising:
N network input/output (I/O) ports connected to a first set of I/O pins on the PHY chip, where N is an integer;
M system interfaces connected to a second set of I/O pins on the PHY chip, where M is an integer;
a first external recovered clock input connected to a third set of I/O pins on the PHY chip;
a first recovered clock output connected to a fourth set of I/O pins on the PHY chip; and
a first clock multiplexer having a plurality of data inputs, a select input, an output coupled to the first recovered clock output and first additional data input coupled to the first external recovered clock input, at least one of the data inputs coupled to a first recovered clock from a respective one of the N network I/O ports,
wherein the sets of I/O pins are arranged radially around a periphery of the PHY chip in the order of one of the first and second sets of I/O pins, one of the third and fourth sets of I/O pins, the other of the first and second sets of I/O pins, and the other of the third and fourth sets of I/O pins.

6. The PHY chip of claim 5 wherein the third and fourth sets of I/O pins and at least one of the first and second sets of I/O pins are physically located on a same side of a package containing the PHY chip.

7. A physical layer (PHY) chip for a synchronous Ethernet comprising:
N network input/output (I/O) ports where N is an integer;
a first external recovered clock input;
a first recovered clock output;
a first clock multiplexer having a plurality of data inputs, a select input, an output coupled to the first recovered clock output and a first additional data input coupled to the first external recovered clock input, at least one of the data inputs of the first clock multiplexer coupled to a first recovered clock from a respective one of the N network I/O ports;
a second external recovered clock input;
a second recovered clock output; and
a second clock multiplexer having a plurality of data inputs, a respective select input, an output coupled to the second recovered clock output and a second additional data input coupled to the second external recovered clock input, at least one of the data inputs of the second clock multiplexer coupled to a second recovered clock from a respective one of the N network I/O ports.

8. The PHY chip of claim 7 further comprising:
a second source of configuration bits coupled to the respective select input of the second clock multiplexer.

9. The PHY chip of claim 8 wherein:
the second source of configuration bits is a second configuration bits register.

10. The PHY chip of claim 7 wherein the second external recovered clock input is coupled to a second additional data input of the first clock multiplexer.

11. A physical layer (PHY) chip for a synchronous Ethernet system comprising:
  N network input/output (I/O) ports where N is an integer;
  a first external recovered clock input;
  a first recovered clock output;
  a first clock multiplexer having a plurality of data inputs, a select input, and output and a first additional data input coupled to the first external recovered clock input, at least one of the data inputs coupled to a first recovered clock from a respective one of the N network I/O ports; and
  a first clock output divider having an input coupled to the output of the first clock multiplexer, and an output coupled to the first recovered clock output, the first clock output divider controlled by configuration bits supplied by a configuration bits register.

12. A method for providing a recovered clock in a PHY chip for a synchronous Ethernet system having a plurality of network interface ports, the method comprising:
  receiving an external recovered clock signal from at least one of the plurality of network interface ports of the PHY chip;
  receiving first and second recovered clock signals from sources outside the PHY chip;
  selecting a first output clock signal from among the first and second recovered clock signals from the source outside the PHY chip and the external recovered clock signals from the at least one of the plurality of network interface ports of the PHY chip; and
  selecting a second output clock signal from among the first and second recovered clock signals from the source outside the PHY chip and the external recovered clock signals from the at least one of the plurality of network interface ports of the PHY chip.

13. The method of claim 12, further comprising dividing the output clock signal by a divisor.

14. The method of claim 12 further comprising:
  dividing the first output clock signal by a first divisor; and
  dividing the second output clock signal by a second divisor.

15. The method of claim 14 where the first divisor and the second divisor are equal.

16. The method of claim 14 where the first divisor and the second divisor are not equal.

* * * * *